(12) United States Patent
Kortesniemi et al.

(10) Patent No.: US 8,126,427 B2
(45) Date of Patent: Feb. 28, 2012

(54) METHOD AND APPARATUS FOR SUPPLYING BILLING INFORMATION A COMMUNICATION DEVICE

(75) Inventors: Jukka Kortesniemi, Vaulnaveys-le-Haut (FR); Olivier Bertin, Peymeinade Alpes-Maritimes (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1011 days.

(21) Appl. No.: 11/911,846

(22) PCT Filed: Apr. 10, 2006

(86) PCT No.: PCT/EP2006/061495
§ 371 (c)(1),
(2), (4) Date: Mar. 21, 2008

(87) PCT Pub. No.: WO2006/117282
PCT Pub. Date: Nov. 9, 2006

(65) Prior Publication Data
US 2011/0171931 A1   Jul. 14, 2011

(30) Foreign Application Priority Data

Apr. 29, 2005   (EP) .................................. 05300337

(51) Int. Cl.
*H04M 11/00*   (2006.01)
(52) U.S. Cl. ........ 455/406; 455/407; 455/409; 455/415; 455/432; 455/405; 379/114.16
(58) Field of Classification Search ................. 455/406, 455/407, 409, 415, 432.1, 435.1, 405; 379/114.16
See application file for complete search history.

(56) References Cited

U.S. PATENT DOCUMENTS
4,122,308 A   10/1978   Weinberger et al.
(Continued)

FOREIGN PATENT DOCUMENTS
EP   1 158 404 A2   11/2001
(Continued)

*Primary Examiner* — Kamran Afshar
*Assistant Examiner* — Yousef Rod

(57) ABSTRACT

According to one aspect of the present invention, there is provided a method, in a billing system, of supplying information to a communication device, comprising, in response to receiving a request, over a first network, to authorize a communication with the communication device: obtaining information relevant to the communication; and providing the obtained information to the communication device via a second network.

28 Claims, 3 Drawing Sheets

U.S. PATENT DOCUMENTS

| | | | |
|---|---|---|---|
| 6,865,262 B1 | 3/2005 | Mitts et al. | |
| 7,221,929 B2 * | 5/2007 | Lee et al. | 455/408 |
| 7,787,858 B2 * | 8/2010 | Koskinen et al. | 455/405 |
| 2003/0083991 A1 * | 5/2003 | Kikinis | 705/40 |
| 2004/0052225 A1 * | 3/2004 | Lundstrom | 370/329 |

FOREIGN PATENT DOCUMENTS

| | | |
|---|---|---|
| EP | 1 158 404 A3 | 4/2004 |
| WO | WO 00/18104 | 3/2000 |

* cited by examiner

METHOD AND APPARATUS FOR SUPPLYING BILLING INFORMATION A COMMUNICATION DEVICE

The present invention relates to the field of communication systems and, more particularly, to methods and apparatus for supplying information, such as financial information, to a communication device.

Use of communication devices for accessing communication services is typically subject to a communication charge being levied on the user by the communication network provider. For example, in the case of conventional fixed or mobile telephone networks, a charge is levied whenever a user makes a charge-incurring use of the network. A charge-incurring use may occur, for example, when a subscriber makes a telephone call to a non-free telephone number, or when a user accesses a data networks such as the Internet, or the like.

In order to make use of a communication network, such as a telephony network, a user is typically required to subscriber to the network and to have an account with the telephony network operator, so that any charges arising though any charge-incurring use of the network may be billed to the subscribers account. Billing is typically performed either as post-paid billing or as pre-paid billing.

In post-paid billing at the end of each charge-incurring use made by a mobile telephone the telephony network generates a call detailed record (CDR) indicating, typically, the destination of the call, the location of the mobile telephone when the call was made (if applicable), and the length of the call. All the CDRs for a given subscriber are accumulated and periodically, for example on a monthly basis, are processed to produce an invoice which is sent to the subscriber. Typically the subscriber has previously contracted with the network provider to pay the full amount of any invoice, so that received invoices serve generally just as a record for the subscriber of use made of the network.

Pre-paid billing, on the other hand, requires a subscriber to have a pre-paid account, and typically only enables charge-incurring use of the telephony network to be made whilst the pre-paid account has a positive account balance. Thus, whenever a request to make a charge-incurring use is made the billing system is requested to authorize the use. Authorisation is given if the subscribers account balance is positive, otherwise authorization is not given. During a telephone call for example, the pre-paid account is debited, typically in substantially real-time, and if at any time the pre-paid account balance reaches zero the on-going call is disconnected.

Pre-paid billing has become increasingly popular as a payment method over recent years, and provides a number of key benefits to both the network provider and subscribers alike. For example, network providers obtain money upfront, prior to any charge-incurring use of the telephony network being made and are hence relieved of the problem of having to recover monies for charge-incurring use which has already taken place. For subscribers, pre-paid billing provides a convenient way of budgeting for communication services, and helps prevents subscribers from unknowingly running up large bills.

One of the problems with pre-paid billing for the subscriber, however, is that it is difficult for the subscriber to precisely manage and observe the amount of credit available in their pre-paid account at any given time.

Typically, subscribers may obtain their current pre-paid account balance by making a call to an intelligent voice response (IVR) service provided by the network provider to receive their current account balance in spoken form. Many networks also enable subscribers to receive, on request, a short message system (SMS) message containing details of their current account balance. Other mechanisms for obtaining an account balance include use of suitable Internet-based applications accessible through an Internet browser, or through use of unstructured supplementary service data (USSD) on GSM networks.

Network providers may also automatically send an SMS message containing details of the current account balance at predetermined periods such as after each call or when the account balance falls below a predetermined threshold.

Such systems enable a subscriber to obtain their account balance prior to making a charge-incurring use of the network enabling them to estimate whether they have sufficient credit for the intended use or for enabling them to estimate the expected maximum duration of the use.

However, one of the problems encountered by subscribers is that it is typically difficult for a subscriber to know how much any given charge-incurring use is going to cost in advance. One of the reasons for this is that the majority of network providers use complex charging schemes for defining the billing rate of charge-incurring use, such as telephone calls. For example, most same country telephone calls are charged at one rate between certain 'peak' times, and at a lower rate during 'off-peak' times. Calls to non-geographic numbers may vary from free, for example for calls to the emergency services, to so-called premium rates, for example for calls to some audio services. Network providers may also provide additional subscriber options which allow users a certain number of minutes of free calls, enable calls to certain numbers to be made at reduced rates, and so on.

A further problem is that, given the subscriber typically does not easily know how much a call is going to cost prior to making the call, the subscriber is also typically unable to determine, or even to estimate, his account balance whilst a call is in progress. Thus, in the case where a user knows his account balance prior to making a call but is unsure of the charging rate applicable for the call the user has to mentally estimate the maximum amount of time the call may last so as to ensure that the call is not disconnected during the call due to a zero account balance.

The present situation is somewhat inconvenient for the user.

Accordingly, one aim of the present invention is to overcome or at least alleviate at least some of the above-mentioned problems.

According to a first aspect of the present invention there is provided a method, in a billing system, of supplying information to a communication device. The method comprises, in response to a receiving a request, over a first network, to authorize a communication with the communication device, obtaining information relevant to the communication; and providing the obtained information to the communication device via a second network.

Advantageously, such a system enables the user of a communication device to have access to accurate information, such as financial information, relevant to the communication, even whilst the communication is in progress. Such information could include, for example, the balance of the subscribers account, the billing rate applicable to the current communication, the expiry date of any account credit and the like. This ensures that subscribers are better informed and are able to make better use of their communication devices and communication services. Furthermore, such a system enables network providers to provide a simple system for supplying such information to subscribers.

Suitably the first network is a circuit-switched voice and signaling network in which case the method may further comprise performing the steps of obtaining and providing in response to an authorization request being received via the circuit-switched network.

Suitably the second network is a data network, in which case the method may further comprise establishing a data connection with the over the data network with the communication device and providing the obtained information to the communication device over the data connection.

Suitably, where the request to establish a communication comprises an identifier for identifying a subscriber account of the billing system and the step of obtaining information further comprises obtaining the balance of the subscriber account.

Suitably the identifier is a calling party number identifying the subscriber account, in which case the step of obtaining information further comprises obtaining the balance of the identified subscriber account.

Suitably, where the request to establish a communication comprises a billing rate identifier identifying a billing rate for the communication, the steps of obtaining information and providing information further comprise obtaining and providing the billing rate applicable to the communication.

Suitably, wherein the request to establish a communication comprises a called party number, the steps of obtaining information and providing information further comprise obtaining and providing the billing rate applicable to the called party number.

Suitably, the method further comprises repeatedly performing the steps of obtaining and providing throughout the lifetime of the communication.

According to a second aspect of the present invention, there is provided a method, in a communication device operable to simultaneously access a first and second network, of handling information received in response to making a request to establish a communication over the first network. The method comprises receiving information via the second network, and processing the received information.

Suitably, the first network is circuit-switch network and the second network is a data network.

Suitably, the step of receiving information comprises receiving an account balance.

Suitably, the step of receiving information comprises receiving a billing rate applicable to the communication.

Suitably, the step of processing comprises outputting the received information on an output device of the communication device.

Suitably, the step of processing comprises storing the received account balance and debiting the stored account balance at the received billing rate during the lifetime of the communication in such a way that the stored account balance is substantially the same as the corresponding account balance stored in a network billing system.

Suitably, the steps of receiving and processing are performed repeatedly throughout the lifetime of the communication.

According to a third aspect of the present invention, there is provided a method, in a telecommunication network comprising a first and second network, of providing information to a communication device. The method comprises receiving a request from a communication device to establish a communication over the first network, obtaining information relevant to the communication, and providing the obtained information to the communication device over the second network.

Suitably, the first network is a circuit-switched network and the second network is a data network.

Suitably, the step of obtaining information comprises obtaining information from a billing system.

Suitably, the step of receiving a request includes receiving a request including an identifier identifying a subscriber account of the billing system.

Suitably, the step of obtaining information further comprises obtaining the account balance of the identified subscriber account.

Suitably, the step of receiving a request comprises receiving a call establishment request.

Suitably, the step of obtaining information comprises obtaining information from a subscriber account identified by way of a calling party number.

Suitably, the step of receiving a request includes receiving a request comprising a billing rate identifier identifying a billing rate for the communication.

Suitably, the step of obtaining information includes obtaining the billing rate applicable to the communication.

Suitably, the information identifying a billing rate is a called party number, and wherein the step of obtaining information further comprises obtaining a billing rate applicable to the called party number.

Suitably, the method further comprises obtaining authorization from the billing system to establish the communication and, where authorization is given, completing the call establishment request.

Suitably, prior to completing the call establishment request, the method includes the step of requesting confirmation from the communication device to proceed with the call establishment request.

Suitably, the method further comprises delaying the establishment of the call establishment request for a predefined period.

Suitably, the method further comprises, during the lifetime of the call, periodically obtaining the information from the billing system.

Suitably, the method further comprises, upon disconnection of the established call, obtaining and providing further information to the communication device.

According to a fourth aspect of the present invention, there is provided a billing system operable in accordance with any of method steps described above.

According to a fifth aspect of the present invention, there is provided a communication device operable in accordance with any method steps described above.

According to a sixth aspect of the present invention, there is provided telecommunications system operable in accordance with any of method steps described above.

According to a seventh aspect of the present invention, there is provided a telecommunications system having a billing system as described above.

An embodiment of the present invention will now be described, by way of example, with reference to the accompanying drawings, in which.

Figure 1:
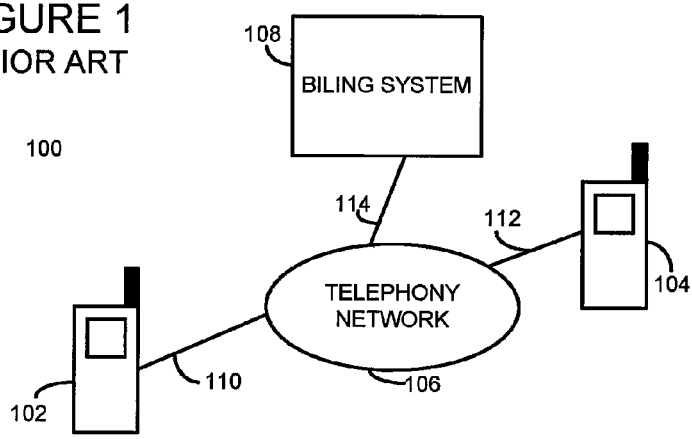
FIG. 1 is a block diagram showing a conventional telephony system using a pre-paid billing system, according to the prior art.

Referring now to FIG. 1, there is shown a block diagram showing a conventional circuit-switched telephony network 100 using a pre-paid billing system 108 according to the prior art. Those skilled in the art will appreciate that the diagram gives a somewhat simplified view and that not all network elements are shown. Those skilled in the art will also appreciate that the network 106 provides both signaling and voice paths, and may suitably be a first or second generation (so-called 1g or 2g network), such as a global system for mobile (GSM) network or other similar network.

The network 106 may also provide, although this is not shown, access to packet data services via a packet-switched data network. However, those skilled in the art will appreciate that current 1g or 2g networks do not enable simultaneous use of both circuit-switched and packet-data networks.

The user of the mobile telephone 102 is a subscriber to the telephony network 106 and has a pre-paid subscriber account, details of which are stored in a pre-paid billing system 108. The pre-paid billing system 108 comprises a database (not shown) of all of the subscribers of the network 106 having a pre-paid billing account along with details of their current account balance.

When the user of the mobile telephone 102 makes a telephone call to the mobile telephone 104 signaling messages, such as SS7 signaling messages, are sent to the telephony network 106 over a signaling path 110. The signaling messages indicate the called party number of the mobile telephone 104 and the calling party number of the mobile telephone 102. The network 106 recognizes the calling party number as having an associated a pre-paid account and requests authorization from the billing sub-system 108, via a signaling path 114, for the call to be completed.

If the account balance is positive, authorization is given and the network completes the call establishment request in the normal manner. If, however, the current account balance is zero or negative, the call establishment request is not completed, and an appropriate audio message may be played to the mobile telephone 102 indicating that the subscriber does not have sufficient credit to place a call.

If the call is connected, the network 106 periodically informs the billing system 108 that the call is on-going. The frequency at which this is done may be specified by the billing system 108 and may vary depending on, for example, the current account balance or other factors. The frequency may typically be between 30 and 90 seconds, although it may be considerably longer or shorter depending on specific requirements.

The billing system 108 determines the billing rate for the call, for example, based on the called party number and the appropriate call charging scheme applicable to the subscriber of the mobile telephone 102. The billing system repeatedly updates the subscriber's account balance during the call causing resulting in the subscriber being billed for the call as the call is on-going.

If at any time during the call the account balance of the subscriber's pre-paid account reaches zero, the billing system 108 informs the network 106 and the network 106 disconnects the call.

When the call is disconnected, for example either if the mobile telephone 102 or 104 hangs-up, the network 106 informs the billing system 108, and the subscriber's account balance is updated accordingly.

As will be apparent to those skilled in the art, a similar billing mechanism may be used for use of a data network, such as a general packet radio system (GPRS) network. It will also be understood that in conventional 1g or 2g networks it is not typically possible to make use of both voice and data networks simultaneously.

Figure 2:
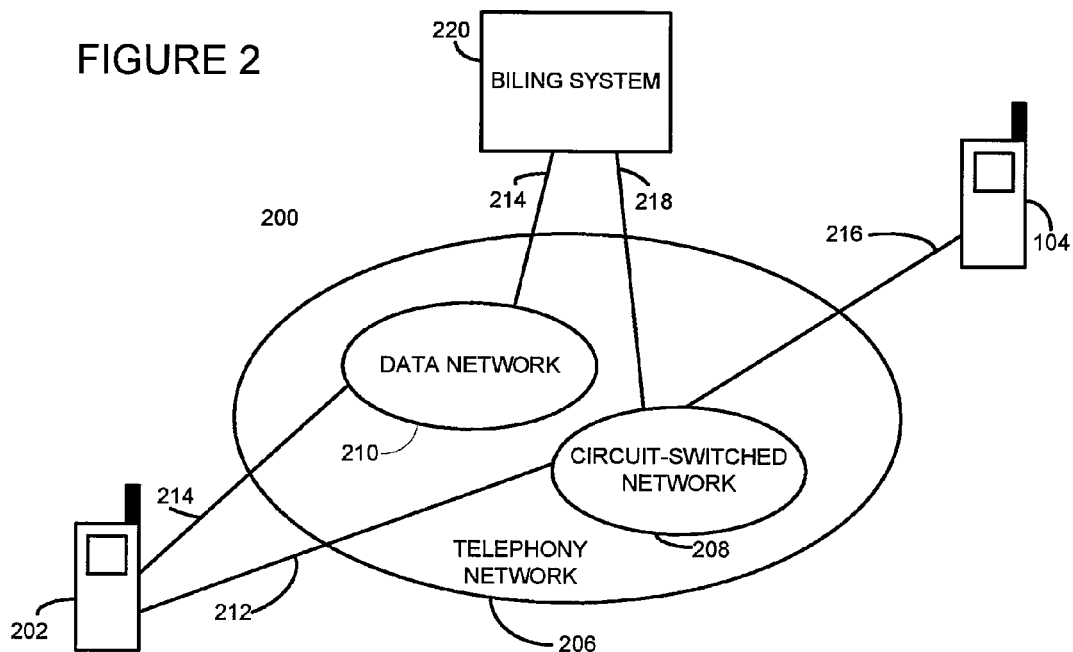
FIG. 2 is a shown a block diagram of a mobile telephony system 200 according to one embodiment of the present invention.

Referring now to FIG. 2, there is shown a block diagram of a mobile telephony system 200 according to one embodiment of the present invention.

A telephony network 206 provides a circuit-switched network 208, providing voice and signaling paths 212, and a data network 210. In the present embodiment the mobile telephone 202 is able to make simultaneous use of the data network 210 and the circuit-switched network 208. Such functionality may be provided for, for example, by so-called third generation (3g) telephony networks, such as a universal mobile telecommunications service (UMTS), wideband code division multiple access (WCDMA) network, or the like, and compatible communication devices.

The user of the mobile telephone 202 is a subscriber to the telephony network 206 and has a pre-paid user account, details of which are stored in a pre-paid billing system 220. The pre-paid billing system 220 comprises a database (not shown) containing details of all of the subscribers of the network 206 having a pre-paid billing account along with details of their current account balance and information enabling the billing to determine a billing rate to be applied to any given call. Although shown as being outside the telephony network 206, the billing system 220 may equally be incorporated therein.

When user of the mobile telephone 202 places a circuit-switched voice call to the mobile telephone 204 a call establishment request in the form of signaling messages, such as SS7 signaling messages, are sent to the telephony network 206 over a voice/signaling path 212. The signaling messages indicate the called party number of the mobile telephone 104 and the calling party number of the mobile telephone 202. The network 206 recognizes the calling party number of the mobile telephone 202 as having an associated a pre-paid account and requests from the billing sub-system 220, via a signaling path 218, authorization to complete the call establishment request. If the subscriber's account balance is positive the call establishment request is authorized and may be completed with the call being connected in the normal manner. If, however, the current account balance is zero or negative, the call establishment request is not authorized and hence not completed. In this case an appropriate audio message or other indication may be notified to the mobile telephone 202 indicating that the subscriber does not have sufficient credit to place a call.

If the call is connected, the network 206 notifies the billing system 220 to appropriately update the subscriber's account balance. Periodically during the call the network 206 notifies the billing system 220 that the call is still in progress so that subscriber's account balance can be debited during the lifetime of the call. Preferably the account balance is debited in real-time or in substantially real-time.

Figure 3:
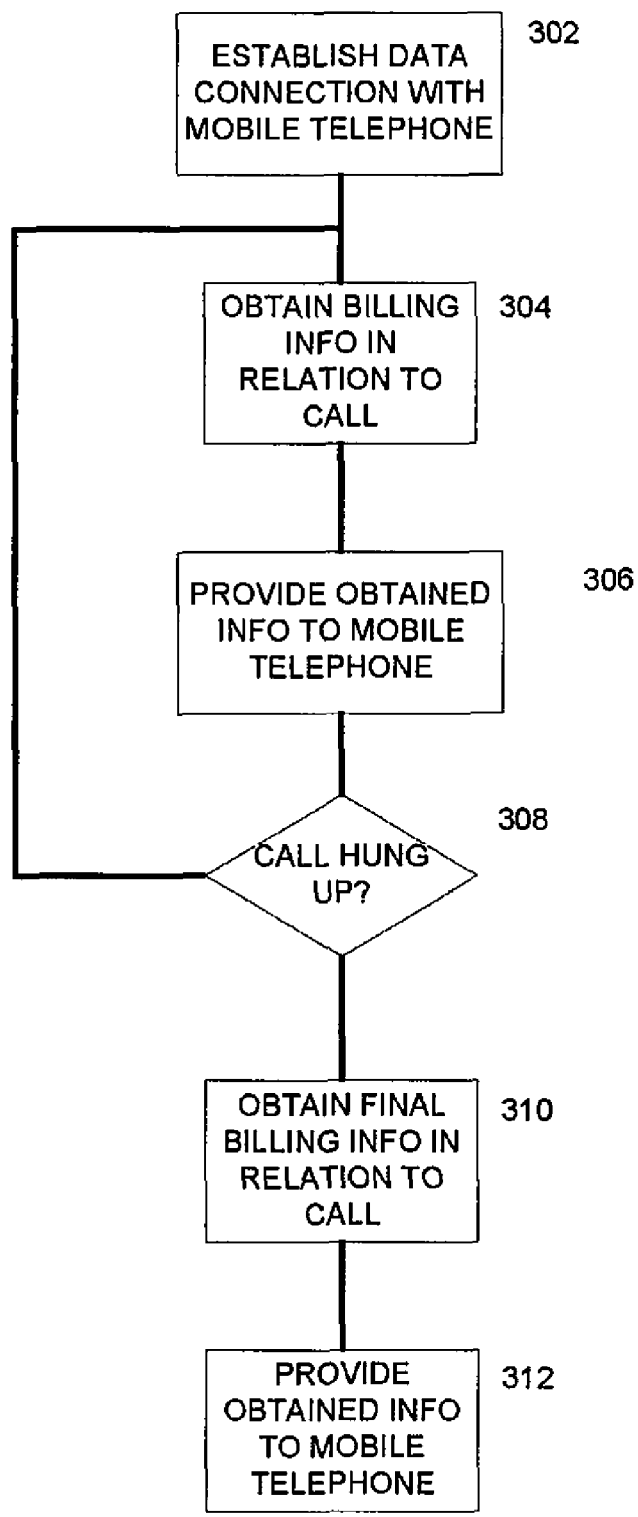
FIG. 3 is a flow diagram outlining example processing steps taken by the billing system according to one embodiment of the present invention.

Further reference is now made to FIG. 3 which is a flow diagram outlining example processing steps taken by the billing system 220 according to one embodiment of the present invention. When the billing system 220 is requested to authorize the completion of a call establishment, as described above in response to the mobile telephone 202 making a call establishment request, the billing system 220 establishes (step 302), via data network 210, a data connection 214 with a client information application (not shown) running on the mobile telephone 202. Once the data connection 214 is established the billing system 220 obtains (step 304) and provides (step 306) to the client information application details of information relevant to the call. For example, relevant information may include details of the subscriber's current account balance, the call billing rate applicable for the current call, expiry date of the account balance, details of special offers or promotions, or any relevant or useful information. The call billing rate may be a billing amount for a predetermined period of time, for example 0.10 cents wherein the predetermined period of time is one minute. Alternatively, the call billing rate may include details of the period of time to which the billing amount is applicable, for example, 0.25 cents per call, or 0.45 cents per 30 seconds. Such information is supplied to the mobile telephone 202 whilst the call establishment request is completing, or whilst the call is connected.

The client information application on the mobile telephone 202 stores the received information in a suitable storage device, such as an internal memory, and outputs the received information to the user via a suitable output device on the mobile telephone 202, such as a suitable visual display device. Alternatively, output of the information could be by way of an audio output, vibrating output any other suitable sensory output system.

As the billing system 220 updates the subscriber's account balance in the billing systems 220 throughout the lifetime of the established call, so the billing system 220 periodically provides details of the current account balance and, where appropriate, current call billing rate to the mobile phone 202 over the data connection 214. In a preferred embodiment the billing system 220 supplies information such as the subscriber's account balance in real or substantially real-time, with the aim being that the information provided to the mobile telephone 202 closely resembles that stored or obtained by the billing system 220.

When the call is disconnected (step 308), the billing system may obtain (step 310) and provide (step 312), for example, further information including, for example, details of the total cost of the call.

In this way, the mobile telephone 202 is provided with up-to-date information regarding relevant account, financial, or other information that may be required or of interest to the subscriber during a call or communication. Furthermore, since the subscriber's account balance is stored in the mobile telephone 202 by the client information application it is accessible to the user of the mobile telephone 202 through the client information application at any time.

Figure 4:
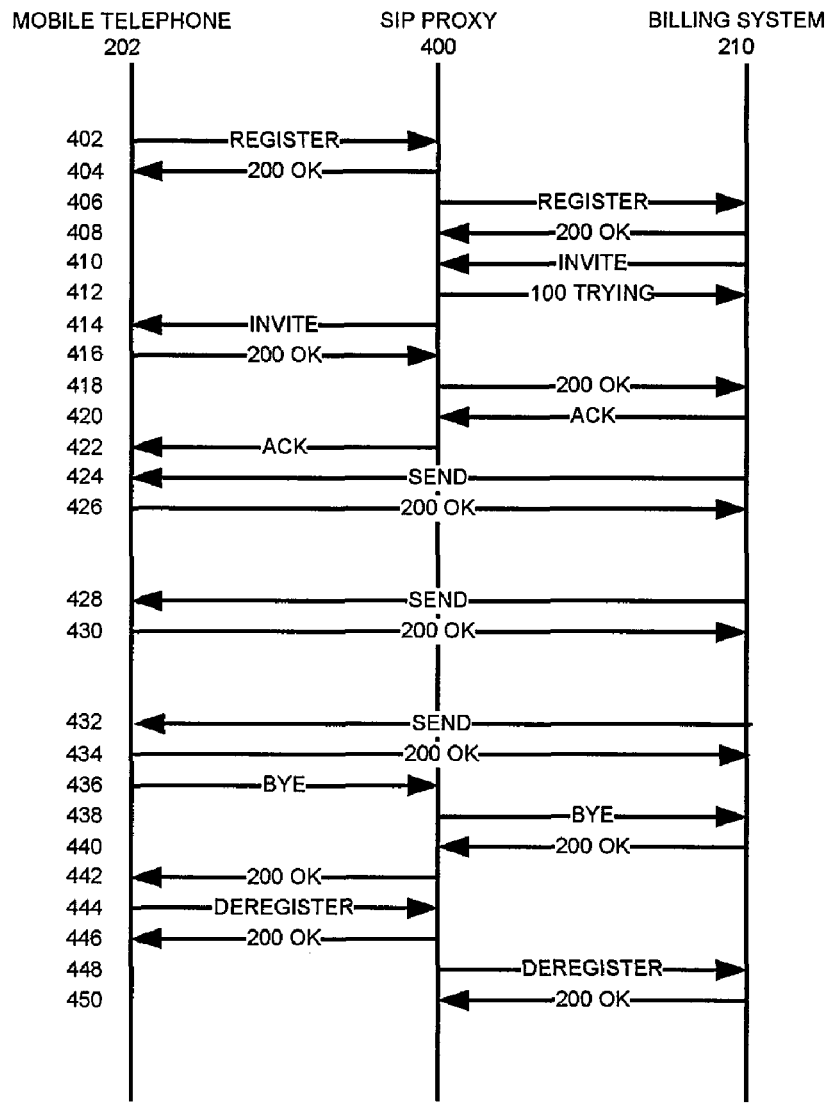
FIG. 4 is a message flow diagram showing example session initiation protocol (SIP) message flows according to an embodiment of the present invention.

Further details, according to an embodiment of the present invention, of one way in which the billing system 220 may provide information to the mobile telephone 202 using the Session Initiation Protocol (SIP) are provided below, with additional reference to FIG. 4. FIG. 4 is a message flow diagram showing example SIP messages which may be sent between the billing system 220, acting as a SIP application server, the mobile telephone 202, acting as a SIP user agent, via a SIP proxy 400. Note that for clarity the SIP proxy 400 is not shown on FIG. 2.

When the mobile telephone 202 initially connects to the mobile telephony network 206, for example after an initial power-on, the mobile telephone 202, for example through the aforementioned client information application, registers its identity with the SIP proxy 400 by sending a REGISTER message 402. The SIP proxy 400 responds with a SIP 200 OK message 404 once registration has been accepted. The proxy 400 forwards the REGISTER message 404 to the billing system 220 (message 406) causing the mobile telephone 202 to be registered with the billing system 220. The billing system 220 acknowledges the registration with a 200 OK message (408).

The billing system 220 creates a logical message session relay protocol (MSRP) URI and creates a session description protocol (SDP) offer containing the generated MSRP URI. The billing system 220 further assigns a local port number for a MSRP billing session. The billing system 220 sends an INVITE request (410) to the mobile telephone 202 (414) via the SIP proxy 400. The proxy 400 responds with a 100 TRYING message provisional response. In response to receiving the INVITE message (414) the mobile telephone 202 sends a 200 OK message (416) to the billing system 220 containing a SDP message session attribute containing a unique MSRP URI for the session with the billing system 220. The mobile telephone 202 binds a TCP socket to its URI and goes into a listening mode.

The 200 OK message is forwarded (418) to the billing system 220 and in response thereto the billing system 220 responds with an ACK message 420. The billing system 220 binds a TCP socket to its URI and initiates a connection with the mobile telephone 202 using the created MSRP URI. The ACK message 422 is forwarded to the mobile telephone 402 via the proxy 400.

When the billing system 220 is requested to authorize a call establishment request from the mobile telephone 202 it sends information to the mobile telephone 202 over the MSRP session using an MSRP SEND request 424 using the established TCP connection. The mobile telephone 202 acknowledges the reception of the MSRP SEND request with a MSRP 200 OK message 426 sent using the established TCP connection.

Periodically, the billing system 220 sends further information to the mobile telephone 202 (428 and 432), to which the mobile telephone 202 appropriately responds with a MSRP 200 OK messages (430 and 434). This process continues whilst the call is in progress. The process may also continue after the call is disconnected enabling, for example, the user to be informed when the account balance is recharged.

When the mobile telephone 202 is switched off it sends a BYE request 436 to the billing system 220 (message 438) via the proxy 400. The billing system 220 invalidates the local MSRP state for the current session with the mobile telephone 202 and confirms this with a 200 OK message (440 and 442). The mobile telephone 202 then proceeds to de-register itself the proxy 400 by sending a DEREGISTER message (444). The proxy 400 responds with a 200 OK message (446) once the deregistration has been completed, and forwards the DEREGISTER message to the billing system 220 (message 448) informing the billing system the mobile telephone 202 is no longer registered. Finally, the billing system 220 acknowledges the proxy 400 by sending a 200 OK message 450.

In a further embodiment the billing system 220 is arranged to only provide the subscribers account balance and the billing rate applicable to the call to the mobile telephone 202 once, rather than periodically throughout the lifetime of the call. Upon receiving the information, and upon completion of the call establishment request, the client information application starts a timer to determine the length of the call. The client information application outputs the received account balance via the mobile telephone 202 and, throughout the lifetime of the call, periodically updates the stored and output account balance based on the received billing rate applicable to the call and the current length of the call. In this way the mobile telephone 202 permanently stores and calculates an account balance which aims to accurately mirror the subscriber's account balance stored in the billing system 220.

In this way, the billing system only has to communicate information to the mobile telephone 210 once each time a call is made, thereby reducing the network resources required.

Furthermore, by storing the calculated account balance in the mobile telephone 210 enables a subscriber to consult his account balance at any time, even when a connection to the network 206 is not available. The internally calculated account balance should, therefore, accurately mirror the actual subscriber account balance stored in the billing system 220. In the case of any discrepancy, the next time a call is made by the mobile telephone 202 the billing system will cause the actual current account balance held in the billing system 220 to be stored by the client information application of the mobile telephone 202.

In a yet further embodiment, the billing system 220 provides, in response to a request to authorize a call establishment request from the mobile telephone 202, the subscribers account balance and, if required, additional information such as billing rate, to the mobile telephone 202 in the manner described above. However, prior to the network 206 completing the call establishment request the network 206 introduces a delay, for example in the order of a few seconds, to enable the subscriber to view his account balance and, if appropriate, billing rate for the call to be made, giving the subscriber enough time to disconnect the call prior to the call establishment request of the call being completed. In this way, a subscriber may decide not to proceed with a call depending on his current account balance or the notified billable rate for the call.

In a still further embodiment, the billing system 220 provides, in response to a request to authorize a call establishment request from the mobile telephone 202, the subscribers account balance and, if required, additional information such as billing rate applicable to the called subscriber number, to the mobile telephone 202. The network 206 is arranged to request a confirmation from the subscriber that he wishes the call establishment request to be completed. Those skilled in the art will appreciate that a confirmation could be provided through use of dual tone multi-frequency (DTMF) tones, through voice recognition, or the like.

The introduction of a delay or the requesting a confirmation once the initial information has been output by the communication device may be particularly useful when premium rate communications are made, for which the user may not necessarily be aware of the high cost associated therewith.

In a further embodiment, the mobile telephone 202 is arranged to modify the manner in which the information, such as the user's account balance, is output depending on various criteria. For example, as the user's account balance reduces as a call is in progress, the mobile telephone may display the account balance in different colours according to different predetermined thresholds. For instance, if the user's account balance is above $10, the account balance is displayed in green, between $5 and $10 the account balance is shown in yellow, and below $5 the account balance is shown in red. The mobile telephone 202 may also be arranged to vibrate or output other sensory information if the account balance falls below a predetermined threshold.

Those skilled in the art will appreciate that in some mobile telephony systems charges may be applied to a subscriber for receiving a call and the above described methods and apparatus may be suitably applied to such systems. For example, the above-described embodiments may be arranged to enable the receiver of a call to be informed of his current account balance and/or and billing rate applicable. Such a system may also provide a delay or request a confirmation to accept the call.

Reference to mobile telephones is intended to include similar communication devices, such as suitably fixed telephone handsets, suitable personal communication devices and the like.

The invention claimed is:

1. A method, in a billing system, of supplying information to a first communication device, comprising:
   receiving a request, over a first network, to authorize a communication between the first communication device and a second communication device, wherein the first network is a circuit switched voice and signaling network;
   in response to receiving the request, establishing a data connection with the first communication device via a second network, wherein the second network is a data network;
   obtaining information relevant to the communication, including a call billing rate; and
   providing the obtained information to the first communication device over the data connection via the second network while the first communication device is connected to the second communication device via the first network.

2. The method of claim 1, wherein the steps of obtaining and providing are in response to an authorization by the billing system for establishing the communication between the first communication device and the second communication device via the first network.

3. The method of claim 1, wherein the request to authorize the communication comprises an identifier capable of identifying a subscriber account of the billing system, and the step of obtaining information further comprises obtaining an account balance of the identified subscriber account.

4. The method of claim 3 wherein the identifier is a calling party number identifying the subscriber account.

5. The method of claim 1, wherein the request to establish a communication comprises a billing rate identifier identifying the call billing rate for the communication.

6. The method of claim 1, wherein the request to authorize the communication comprises a called party number, and the steps of obtaining information and providing information further comprise obtaining and providing the billing rate applicable to the called party number.

7. The method of claim 1, further comprising repeatedly performing the steps of obtaining and providing throughout the lifetime of the communication.

8. A billing system operable in accordance with claim 1.

9. A method, in a first communication device to simultaneously access a first and second network, of handling information, comprising:
   making a request to establish a communication to a second communication device over the first network, wherein the first network is a circuit switched voice and signaling network;
   receiving information relevant to the communication, including a call billing rate applicable to the communication, via the second network while the first communication device is connected to the second communication device, wherein the second network is a data network; and
   processing the received information, including storing the received information in a storage device.

10. The method of claim 9, wherein receiving information further comprises receiving an account balance.

11. The method of claim 10, wherein the step of processing comprises storing the received account balance in the storage device, and debiting the stored account balance at the received call billing rate during the lifetime of the communication in such a way that the stored account balance is substantially the same as the corresponding account balance stored in a network billing system.

12. The method of claim 9, wherein the step of processing comprises outputting the received information on an output device of the first communication device.

13. The method of claim 9, wherein the steps of receiving and processing are performed repeatedly throughout the lifetime of the communication.

14. A communication device operable in accordance with claim 9.

15. A method, in a telecommunication network comprising a first and second network, of providing information to a first communication device, the method comprising:
- receiving a request from a first communication device to establish a communication to a second communication device over the first network, wherein the first network is a circuit switched voice and signaling network;
- establishing a data connection with the first communication device via the second network, wherein the second network is a data network;
- obtaining information relevant to the communication, including a call billing rate applicable to the communication; and
- providing the obtained information to the first communication device over the second network while connecting the first communication device to the second communication device via the first network.

16. The method of claim 15, wherein the step of obtaining information comprises obtaining information from a billing system.

17. The method of claim 15, wherein the step of receiving a request includes receiving a request including an identifier for identifying a subscriber account of the billing system.

18. The method of claim 17, wherein the step of obtaining information further comprises obtaining an account balance of the identified subscriber account.

19. The method of claim 15, wherein the step of receiving a request comprises receiving a call establishment request.

20. The method of claim 19, further comprising obtaining authorization from the billing system to establish the communication and, where authorization is given, completing the call establishment request.

21. The method of claim 20, further comprising, prior to completing the call establishment request, requesting confirmation from the first communication device to proceed with the call establishment request.

22. The method of claim 20, further comprising, delaying the establishment of the call establishment request for a predefined period.

23. The method of claim 20, further comprising, during the lifetime of the call, periodically obtaining the information from the billing system.

24. The method of claim 20, further comprising, upon disconnection of the established call, obtaining and providing further information to the first communication device.

25. The method of claim 17, wherein the subscriber account is identified by way of a calling party number.

26. The method of claim 15, wherein the step of receiving a request includes receiving a request comprising a billing rate identifier identifying a billing rate for the communication.

27. The method of claim 26, wherein the billing rate identifier is a called party number, and wherein the step of obtaining information further comprises obtaining a billing rate applicable to the called party number.

28. A telecommunications system operable in accordance with claim 15.

* * * * *

UNITED STATES PATENT AND TRADEMARK OFFICE
CERTIFICATE OF CORRECTION

| | | |
|---|---|---|
| PATENT NO. | : 8,126,427 B2 | Page 1 of 1 |
| APPLICATION NO. | : 11/911846 | |
| DATED | : February 28, 2012 | |
| INVENTOR(S) | : Jukka Kortesniemi et al. | |

It is certified that error appears in the above-identified patent and that said Letters Patent is hereby corrected as shown below:

On the title page, in field (54), and in column 1, line 2, Title, delete "A" and insert -- TO A --, therefor.

Signed and Sealed this
Fourth Day of December, 2012

David J. Kappos
*Director of the United States Patent and Trademark Office*